United States Patent
Liang et al.

(10) Patent No.: US 10,502,969 B2
(45) Date of Patent: Dec. 10, 2019

(54) 3D IMAGING METHOD AND APPARATUS FOR ALTERNATELY IRRADIATING FIRST AND SECOND POLARIZED LIGHT

(71) Applicant: GUANGZHOU UC NETWORK TECHNOLOGY CO., LTD., Guangzhou, Guangdong (CN)

(72) Inventors: Jie Liang, Guangzhou (CN); Yankun Zhen, Guangzhou (CN)

(73) Assignee: Guangzhou UC Network Technology Co., Ltd., Guangzhou (CN)

( * ) Notice: Subject to any disclaimer, the term of this patent is extended or adjusted under 35 U.S.C. 154(b) by 45 days.

(21) Appl. No.: 15/843,994

(22) Filed: Dec. 15, 2017

(65) Prior Publication Data
US 2018/0107013 A1 Apr. 19, 2018

Related U.S. Application Data

(63) Continuation of application No. PCT/CN2016/085749, filed on Jun. 14, 2016.

(30) Foreign Application Priority Data

Jun. 18, 2015 (CN) .......................... 2015 1 0346485

(51) Int. Cl.
*G02B 5/30* (2006.01)
*G02B 27/22* (2018.01)
(Continued)

(52) U.S. Cl.
CPC ....... *G02B 27/2264* (2013.01); *G02B 5/3083* (2013.01); *G02B 27/26* (2013.01);
(Continued)

(58) Field of Classification Search
CPC .............. G02B 27/2264; G02B 27/283; G02B 5/3083; G02B 27/26; G02B 27/22;
(Continued)

(56) References Cited

U.S. PATENT DOCUMENTS 7,605,981 B2 * 10/2009 Adachi .............. G02B 27/2278
359/629
10,074,031 B2 * 9/2018 Krenzer ............. G06K 9/00335
(Continued)

FOREIGN PATENT DOCUMENTS

CN 102088615 A 6/2011
CN 102364378 A 2/2012
(Continued)

OTHER PUBLICATIONS

Chinese Search Report for Application No. CN2015103464854, dated Jun. 21, 2017, 1 page.
(Continued)

*Primary Examiner* — Shan E Elahi
(74) *Attorney, Agent, or Firm* — Sheppard Mullin Richter & Hampton LLP

(57) ABSTRACT

The present application discloses a 3D imaging method and apparatus, which divide a source 3D image light into two polarized light beams carrying image information through a birefringence effect, adjust optical paths of the two polarized light beams obtained through birefringence, and control the two polarized light beams to be alternately irradiated, thereby achieving 3D imaging; since the implementation of the above imaging method only requires one imaging apparatus having corresponding functions, the present application can simplify the system structure and reduce the system cost relative to a conventional 3D projection technology that requires two imaging devices; moreover, a viewer can directly see, with no need to wear corresponding 3D glasses, a 3D image due to the parallax caused by alternate irradiation of two polarized light beams carrying image information out of a projection device.

20 Claims, 2 Drawing Sheets

(51) Int. Cl.
*G02B 27/26* (2006.01)
*H04N 13/337* (2018.01)
*H04N 13/341* (2018.01)
*H04N 13/398* (2018.01)
*G02B 27/28* (2006.01)
*H04N 13/305* (2018.01)
*G02F 1/01* (2006.01)
*G02F 1/07* (2006.01)
*G02F 1/09* (2006.01)

(52) U.S. Cl.
CPC ......... *G02B 27/283* (2013.01); *H04N 13/305* (2018.05); *H04N 13/337* (2018.05); *H04N 13/341* (2018.05); *H04N 13/398* (2018.05); *G02F 1/0131* (2013.01); *G02F 1/0136* (2013.01); *G02F 1/07* (2013.01); *G02F 1/09* (2013.01)

(58) Field of Classification Search
CPC .. H04N 13/337; H04N 13/398; H04N 13/341; H04N 13/305; G02F 1/09; G02F 1/07; G02F 1/0136; G02F 1/0131
USPC .......................................................... 348/57
See application file for complete search history.

(56) References Cited

U.S. PATENT DOCUMENTS

| | | | |
|---|---|---|---|
| 2002/0015919 A1* | 2/2002 | Kristensen | G02B 6/02109 430/321 |
| 2003/0223083 A1* | 12/2003 | Geng | G01B 11/2509 356/603 |
| 2006/0038964 A1* | 2/2006 | Lu | G03B 21/14 353/84 |
| 2007/0052928 A1* | 3/2007 | Maeda | G02B 27/1026 353/20 |
| 2008/0150913 A1* | 6/2008 | Bell | G06F 3/011 345/175 |
| 2010/0182688 A1 | 7/2010 | Kim et al. | |
| 2011/0199402 A1* | 8/2011 | Ishii | G09G 3/002 345/690 |
| 2011/0292505 A1* | 12/2011 | Kurtz | G02B 7/028 359/489.14 |
| 2012/0044431 A1* | 2/2012 | Osterman | G02F 1/13471 349/15 |
| 2012/0081623 A1 | 4/2012 | Yamaguchi et al. | |
| 2013/0044147 A1* | 2/2013 | Kim | G09G 3/3426 345/697 |
| 2013/0083014 A1* | 4/2013 | Park | H04N 13/337 345/419 |
| 2013/0100333 A1* | 4/2013 | Awatsuji | G03H 1/0443 348/335 |
| 2013/0141420 A1* | 6/2013 | Erignac | G06T 17/00 345/419 |
| 2013/0182169 A1* | 7/2013 | Kosugi | G02B 23/2415 348/335 |
| 2013/0215373 A1* | 8/2013 | Naganuma | H04N 13/00 349/155 |
| 2013/0282083 A1* | 10/2013 | Vertikov | A61B 5/14532 607/100 |
| 2013/0335740 A1* | 12/2013 | Ishimaru | G01N 21/23 356/365 |
| 2013/0338439 A1* | 12/2013 | Kosugi | A61B 1/00193 600/111 |
| 2014/0028933 A1 | 1/2014 | Chen et al. | |
| 2014/0063466 A1* | 3/2014 | Homma | G02B 27/26 353/20 |
| 2014/0267242 A1 | 9/2014 | Uehara | |
| 2014/0347361 A1* | 11/2014 | Alpaslan | H04N 13/307 345/426 |
| 2015/0138459 A1 | 5/2015 | Tsuruyama et al. | |
| 2016/0260244 A1* | 9/2016 | Moravec | G06T 15/205 |
| 2016/0337637 A1* | 11/2016 | Hwang | H04N 13/315 |
| 2017/0032214 A1* | 2/2017 | Krenzer | G06K 9/00335 |
| 2018/0107013 A1 | 4/2018 | Liang et al. | |

FOREIGN PATENT DOCUMENTS

| | | |
|---|---|---|
| CN | 102375245 A | 3/2012 |
| CN | 102749717 A | 10/2012 |
| CN | 104702938 A | 6/2015 |
| CN | 105511093 A | 4/2016 |
| JP | 2015-099321 A | 5/2015 |

OTHER PUBLICATIONS

First Office Action dated Jun. 30, 2017, issued in related Chinese Application No. 201510346485.4 (8 pages), with English machine translation.

Decision to Grant dated Nov. 16, 2018, issued in related Russian Application No. 2018101695 (16 pages), with English machine translation.

Search Report dated Nov. 16, 201, issued in related Russian Application No. 2018101695 (4 pages), with English machine translation.

PCT International Preliminary Report on Patentability dated Dec. 28, 2017, issued in International Application No. PCT/CN2016/085749 (16 pages).

International Search Report and Written Opinion for Application No. PCT/CN2016/085749, dated Aug. 26, 2016, 11 pages.

* cited by examiner

3D IMAGING METHOD AND APPARATUS FOR ALTERNATELY IRRADIATING FIRST AND SECOND POLARIZED LIGHT

CROSS-REFERENCE TO RELATED APPLICATION

This application is a continuation application of International Application No. PCT/CN2016/085749, filed on Jun. 14, 2016, which is based on and claims priority to and benefits of Chinese Patent Application No. 201510346485.4, filed with the State Intellectual Property Office (SIPO) of the People's Republic of China on Jun. 18, 2015. The entire contents of the above-identified applications are incorporated herein by reference.

TECHNICAL FIELD

The present application relates to the field of optical technologies, and in particular, to a 3D imaging method and apparatus.

BACKGROUND

Along with the development of 3D (3 Dimensions) imaging technologies, the range of applications thereof has been expanded to a plurality of fields, including industrial design, mold design, movie and TV animation, etc. The technologies have provided authentic and 3D visual enjoyment. A conventional 3D imaging system uses two projecting devices having completely the same parameters to alternately project left eye images and right images, respectively, further uses corresponding 3D glasses to make the left and right eye images to enter human eyes at correct time and via corresponding lenses, and then human brain can synthesize the left and right eye images to a 3D image with a true depth of field and with no ghost images according to parallax between left and right eyes.

It can be seen that the above 3D imaging system uses two projection devices to project left and right eye images, respectively, which not only results in a complex system structure, but also increases the system cost. Moreover, 3D glasses to be used together with the projection devices typically include two types: shutter and polarization. If shutter 3D glasses are used, the system cost would be further increased. For application scenarios requiring many 3D glasses, such as cinemas, in particular, the system cost would be even higher; if polarization 3D glasses are used, it would be easy to see ghost images, which leads to a poor 3D effect and is easy to cause eye fatigue. Therefore, how to reduce the cost of a 3D imaging system and to ensure the 3D effect thereof have become issues to be urgently addressed in the art.

SUMMARY

To solve the problems in the prior art, the present application provides a 3D imaging method and apparatus.

A first aspect of the present application provides a 3D imaging apparatus, and the apparatus comprises a light source dividing module, an optical path adjustment module and a controllable switch module, the optical path adjustment module being arranged between the light source dividing module and the controllable switch module; the light source dividing module being configured to divide, through a birefringence effect, a source 3D image light into a first polarized light carrying left eye image information and a second polarized light carrying right eye image information; the optical path adjustment module being configured to adjust optical paths of the first polarized light and the second polarized light according to an imaging position; and the controllable switch module being configured to control the first polarized light and the second polarized light to be alternately irradiated, wherein the alternating frequency between the first polarized light and the second polarized light is equal to the frame rate of the source 3D image light.

Preferably, the light source dividing module is configured to make the first polarized light and the second polarized light to have different emergent directions.

Preferably, the optical path adjustment module is configured to converge the first polarized light and the second polarized light to the imaging position, respectively; and the controllable switch module is arranged at the imaging position.

Preferably, the first polarized light and the second polarized light are guided, after being irradiated from the controllable switch module, to the left eye and the right eye of a user, respectively.

Preferably, the apparatus further comprises a brightness compensation module configured to irradiate an auxiliary parallel light to the controllable switch module, such that the auxiliary parallel light is irradiated together with the first polarized light and the second polarized light.

Preferably, the light source dividing module comprises any one of the following: a uniaxial crystal capable of producing a natural birefringence effect, a colorless optical glass capable of producing a stress birefringence effect, a first optical device formed by a transparent liquid capable of producing an electro-optic birefringence effect and an applied electric field thereof, and a second optical device formed by a transparent liquid capable of producing a magneto-birefringence effect and an applied magnetic field thereof.

Preferably, the method further comprises: an image projecting module configured to project the source 3D image light at the frame rate to the light source dividing module, the source 3D image light comprising a left eye image light and a right eye image light that alternate frame by frame.

A second aspect of the present application provides a 3D imaging method, and the method comprises: dividing, through a birefringence effect, a source 3D image light into a first polarized light carrying left eye image information and a second polarized light carrying right eye image information; adjusting optical paths of the first polarized light and the second polarized light according to an imaging position; and controlling the first polarized light and the second polarized light to be alternately irradiated, wherein the alternating frequency between the first polarized light and the second polarized light is equal to the frame rate of the source 3D image light.

Preferably, the first polarized light and the second polarized light divided through a birefringence effect have different emergent directions.

Preferably, the step of adjusting optical paths of the first polarized light and the second polarized light according to an imaging position comprises: converging the first polarized light and the second polarized light to the imaging position, respectively. The step of controlling the first polarized light and the second polarized light to be alternately irradiated comprises: controlling the first polarized light and the second polarized light to be alternately irradiated with a controllable switch module arranged at the imaging position.

Preferably, the first polarized light and the second polarized light that pass through the controllable switch module are guided to the left eye and the right eye of a user, respectively.

Preferably, the method further comprises: controlling an auxiliary parallel light to be irradiated together with the first polarized light and the second polarized light.

Preferably, the birefringence effect is one of a natural birefringence effect based on a uniaxial crystal, a stress birefringence effect based on a colorless optical glass, an electro-optic birefringence effect based on a transparent liquid and an applied electric field thereof, and a magneto-birefringence effect based on a transparent liquid capable of producing and an applied magnetic field thereof.

Preferably, the method further comprises: projecting the source 3D image light at the frame rate, the source 3D image light comprising a left eye image light and a right eye image light that alternate frame by frame.

It can be seen from the above technical solutions that the embodiments of the present application divide a source 3D image light into two polarized light beams carrying image information through a birefringence effect, adjust optical paths of the two polarized light beams obtained through birefringence, and control the two polarized light beams to be alternately irradiated, thereby achieving 3D imaging; since the implementation of the above imaging method only requires one imaging apparatus having corresponding functions, the present application can simplify the system structure and reduce the system cost relative to a conventional 3D projection technology that requires two imaging devices; moreover, a viewer can directly see, with no need to wear corresponding 3D glasses, a 3D image due to the parallax caused by alternate irradiation of two polarized light beams carrying image information out of a projection device. As a result, the investment on 3D glasses can be saved and the system cost is further reduced.

It should be understood that the above general description and following detailed description are only illustrative and explanatory, and do not limit the present application.

BRIEF DESCRIPTION OF THE DRAWINGS

The accompanying drawings described herein are incorporated in the description and constitute a part of the description. The accompanying drawings herein illustrate embodiments that comply with the present invention, and is used together with the description to describe the principles of the present invention.

DETAILED DESCRIPTION OF THE INVENTION

Illustrative embodiments will be described in detail herein, which are represented in the accompanying drawings. When the accompanying drawings are involved in the description below, identical numbers in different figures represent identical or similar elements, unless otherwise expressed. The implementation manners described in the following illustrative embodiments do not represent all implementation manners that are consistent with the present invention. On the contrary, they are only examples of apparatuses and methods that are consistent with some aspects of the present invention described in detail in the appended claims.

Figure 1:
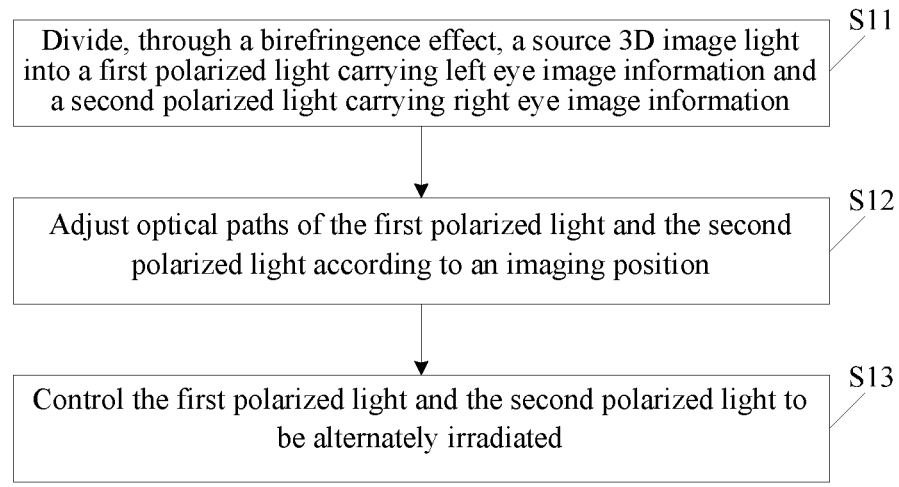
FIG. 1 is a flow chart of a 3D imaging method according to an embodiment of the present application.

FIG. 1 is a flow chart of a 3D imaging method according to an embodiment of the present application. As shown in FIG. 1, the method comprises the following steps.

In Step S11, divide, through a birefringence effect, a source 3D image light into a first polarized light carrying left eye image information and a second polarized light carrying right eye image information. The birefringence effect refers to a phenomenon that a natural light beam passes through an anisotropic medium (the incident direction may be any direction other than the optical axis of the medium) and is refracted into two linear polarized light beams, wherein the vibration directions of the two linear polarized light beams are perpendicular to each other. According to the principle of a 3D imaging method according to an embodiment of the present application shown in FIG. 2, S represents a source 3D image light and M represents an anisotropic medium; S passes through M along a direction other than the optical axis L, and is refracted into two linear polarized light beams o and e with the vibration directions thereof perpendicular to each other (i.e. the above first polarized light and second polarized light), and the image information carried by the two linear polarized light beams is used as a left eye image and a right eye image, respectively.

The source 3D image light is projected at a predetermined frame rate. The source 3D image light may be a light beam carrying image information of an entire image, and as a result, the entire image can be projected.

The source 3D image light comprises a left eye image light (an entire left eye image corresponding to the left eye image light beam) and a right eye image light (an entire right eye image corresponding to the right eye image light beam) that alternate frame by frame, i.e. one frame of the left eye image light immediately followed by one frame of the right eye image light, which is then followed by another frame of the left eye image light. Here, the left eye image light and the right eye image light may be no-polarized light.

Here, the configuration may be in such a way that the first polarized light and the second polarized light divided through a birefringence effect are made to have different emergent directions. Correspondingly, the light beam of the entire image is divided into two beams having different emergent directions.

In this way, optical paths of the first polarized light (the first polarized light beam) and the second polarized light (the second polarized light beam) can be controlled respectively, such that they are ultimately guided into the left eye and the right eye of a user, respectively.

In Step S12, adjust optical paths of the first polarized light and the second polarized light according to an imaging position.

Here, the first polarized light (the first polarized light beam) and the second polarized light (the second polarized light beam) can be converged to the same imaging position, respectively. Through the converge, the cross sections of the first polarized light beam and the second polarized light beam at the imaging position become relatively small and can even approach a point.

In Step S13, control the first polarized light and the second polarized light to be alternately irradiated.

Here, the alternating frequency between the first polarized light and the second polarized light is equal to the frame rate of the source 3D image light.

Here, a controllable switch module arranged at the imaging position can be configured to control the first polarized light (the first polarized light beam) and the second polarized light (the second polarized light beam) to be alternately irradiated. Within a frame period corresponding to the left eye image, the first polarized light (the first polarized light beam) is irradiated, while the second polarized light (the second polarized light beam) is blocked. Within a frame period corresponding to the right eye image, the second polarized light (the second polarized light beam) is irradiated, while the first polarized light (the first polarized light beam) is blocked.

Since both the first polarized light beam and the second polarized light beam are converged to a relatively small imaging position, only a relatively small controllable switch module is needed to control the irradiation and blockage of a polarized optic beam. The bigger a controllable switch module is, the more difficult it is to control the controllable switch module, such as synchronization of its parts. Therefore, the device manufacturing cost and the control complexity are lowered.

Since the first polarized light (the first polarized light beam) and the second polarized light (the second polarized light beam) are converged to the same imaging position, moreover, only one controllable switch module is needed. Therefore, there is no need to provide a controllable switch module for each of the two polarized light beams, which reduces the device manufacturing cost and avoids controls like synchronization of two controllable switch modules.

Since the first polarized light (the first polarized light beam) and the second polarized light (the second polarized light beam) divided through a birefringence effect have different emergent directions, respectively, and correspond to different optical paths, the directions in which they are converged to the imaging position (incident to the controllable switch module) are different as well. Correspondingly, the directions in which they exit from the controllable switch module are different as well. Here, the controllable switch module can be configured to substantially not change the proceeding directions of the first polarized light (the first polarized light beam) and the second polarized light (the second polarized light beam).

Subsequently, the first polarized light (the first polarized light beam) and the second polarized light (the second polarized light beam) that pass through the controllable switch module can be guided to the left eye and the right eye of a user, respectively.

Specifically, when the source 3D image is a left eye image, the controllable switch module blocks the second polarized light (the second polarized light beam), and the first polarized light (the first polarized light beam) carries the left eye image information and enters the user's left eye; when the source 3D image is a right eye image, the controllable switch module blocks the first polarized light (the first polarized light beam), and the second polarized light (the second polarized light beam) carries the right eye image information and enters the user's right eye.

Figure 2:
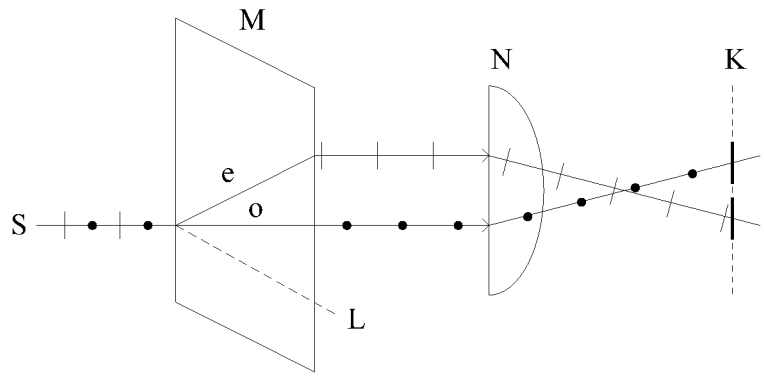
FIG. 2 illustrates the principle of a 3D imaging method according to an embodiment of the present application.

After the polarized lights o and e that carry the left and right eye images are obtained, the two polarized light beams need to be converged at a preset position to form a 3D image, thereby achieving 3D imaging; in light of this, embodiments of the present application control, on one hand, a converge point by adjusting optical paths of the two polarized light beams o and e, i.e. control the imaging position, and on the other hand, control the two polarized light beams o and e to be alternately irradiated, thereby forming parallax between left and right eyes of a view and then synthesizing a 3D image in the viewer's brain. As shown in FIG. 2, the optical paths of the polarized lights o and e can be changed through refraction by the lens N, and o and e are alternately irradiated as controlled by a liquid crystal mask switch K.

On the basis of the above principle, it can be seen that embodiments of the present application can achieve 3D imaging by using only one imaging device, wherein the imaging device has the following three functions: dividing a source 3D image light into two polarized light beams carrying image information through a birefringence effect, adjusting optical paths of the two polarized light beams obtained through birefringence, and controlling the two polarized light beams to be alternately irradiated. Compared with a conventional 3D projection technology that requires two imaging devices, therefore, the application of embodiments of the present application can save one imaging device for each 3D imaging system, thereby simplifying the system structure and reducing the system cost; moreover, a viewer can directly see, with no need to wear corresponding 3D glasses, a 3D image due to the parallax caused by alternate irradiation of two polarized light beams carrying image information out of a projection device. Namely, embodiments of the present application can achieve a naked eye 3D technology, save the investment on 3D glasses, and further reduce the system cost.

In addition, specific application scenarios of the 3D imaging method according to embodiments of the present application comprise 3D displays, 3D film projectors, etc.

The specific implementation manner of the birefringence effect that divides a source 3D image light into two polarized light beams according to embodiments of the present application includes, but is not limited to, any one of the following four.

1) Natural birefringence effect achieved on the basis of a uniaxial crystal: a uniaxial crystal is an anisotropic medium, and birefringence occurs with incidence of natural light being in any direction other than the optical axis thereof; wherein, as the uniaxial crystal is naturally formed, the birefringence effect produced thereby is also referred to as a natural birefringence effect.

2) Stress birefringence effect achieved on the basis of a colorless optical glass: since its internal density is not completely uniform, a colorless optical glass is an anisotropic medium as well and can also produce a birefringence effect; wherein, as the internal density difference of a colorless optical glass is caused by an external force, the birefringence effect produced thereby is also referred to as a stress birefringence effect.

3) Electro-optic birefringence effect achieved on the basis of a transparent liquid and an applied electric field thereof: under the action of an applied electric field, a transparent liquid can have anisotropic properties and produce a birefringence effect, which is also referred to as an electro-optic birefringence effect or Kerr effect.

4) Magneto-birefringence effect achieved on the basis of a transparent liquid and an applied magnetic field thereof: under the action of an applied magnetic field, a transparent liquid can have anisotropic properties and produce a birefringence effect, which is also referred to as a magneto-birefringence effect or Cotton-Mouton effect.

It can be seen from the above implementation manners that the step of obtaining two polarized light beams by means of a birefringence effect, as a key step in the 3D imaging method according to the present application, may be achieved through common uniaxial crystal, colorless optical glass, and transparent liquid applied with an electric field or a magnetic field, thereby ensuring a low cost of the system.

In the 3D imaging method disclosed by a practical embodiment of the present application, at the same time when the first polarized light and the second polarized light are controlled to be alternately irradiated, an auxiliary parallel light may further be controlled to be irradiated together with the first polarized light and the second polarized light.

Figure 3:
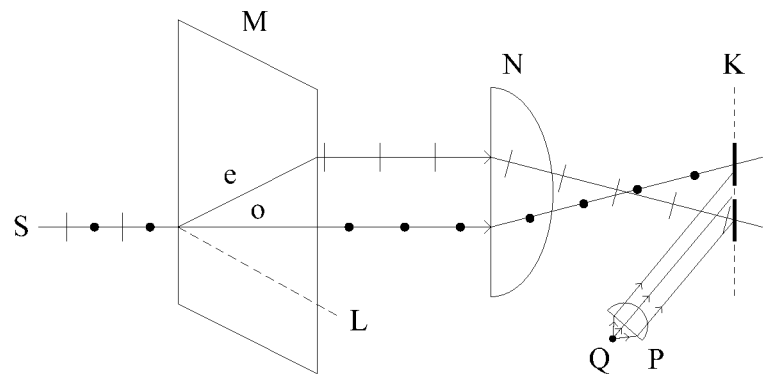
FIG. 3 illustrates the principle of another 3D imaging method according to an embodiment of the present application.

According to a conventional 3D imaging technology, when the lights carrying left and right eye images alternately pass through 3D glasses, a brightness loss will be caused, i.e. the brightness of the lights taken into human eyes is decreased, which tends to cause visual fatigue of a viewer; similarly, brightness loss also exists when the two polarized light beams carrying image information are alternately irradiated in embodiments of the present application. In light of this, according to the principle shown in FIG. 3, an embodiment of the present application provides brightness compensation for the irradiated polarized lights through an auxiliary parallel light, which can increase the brightness of lights into human eyes and prevent visual fatigue of a viewer.

Optionally, the above auxiliary parallel light is obtained through an auxiliary light source and a convex lens. Namely, a scattering auxiliary light source is placed at the focus at one side of the convex lens, and a parallel light can be obtained at the other side of the convex lens. Therefore, the embodiment of the present application can achieve brightness compensation at a relatively low cost, which can both improve the imaging effect and ensure a low cost of the imaging system.

Figure 4:
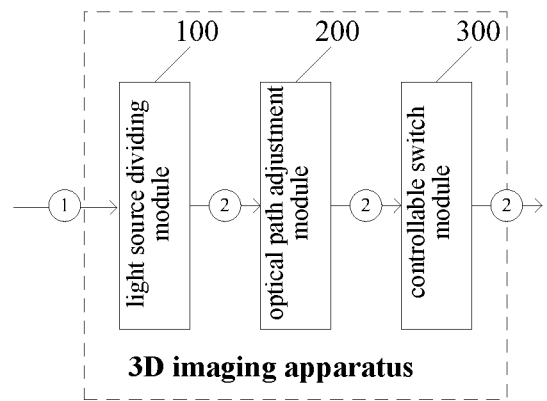
FIG. 4 is a structural schematic diagram of a 3D imaging apparatus according to an embodiment of the present application.

FIG. 4 is a structural schematic diagram of a 3D imaging apparatus according to an embodiment of the present application. Referring to FIG. 4, the apparatus comprises a light source dividing module 100, an optical path adjustment module 200 and a controllable switch module 300. The optical path adjustment module 200 is arranged between the light source dividing module 100 and the controllable switch module 300.

Here, the light source dividing module 100 is configured to divide, through a birefringence effect, a source 3D image light into a first polarized light carrying left eye image information and a second polarized light carrying right eye image information.

The 3D imaging apparatus may further comprise an image projecting module (not shown) configured to project the source 3D image light at a predetermined frame rate to the light source dividing module 100. The source 3D image light may be a light beam carrying image information of an entire image, and as a result, the entire image can be projected. The technical solution of the present application may need only one image projecting module to project both a left eye image light and a right eye image light, with no need to provide an image transmission module for each of the left eye image light and the right eye image light.

The source 3D image light comprises a left eye image light (an entire left eye image corresponding to the left eye image light beam) and a right eye image light (an entire right eye image corresponding to the right eye image light beam) that alternate frame by frame, i.e. one frame of the left eye image light immediately followed by one frame of the right eye image light, which is then followed by another frame of the left eye image light. Here, the left eye image light and the right eye image light may be no-polarized light.

Here, the light source dividing module 100 may be configured to make the first polarized light and the second polarized light to have different emergent directions. Correspondingly, the light beam of the entire image is divided into two beams having different emergent directions. For example, a birefringence crystal of a prism shape may be used to make polarized lights with different refractive indexes (the o light and the e light) to be irradiated in different directions, respectively.

In this way, optical paths of the first polarized light (the first polarized light beam) and the second polarized light (the second polarized light beam) can be controlled respectively, such that they are ultimately guided into the left eye and the right eye of a user, respectively.

The optical path adjustment module 200 is configured to adjust optical paths of the first polarized light and the second polarized light according to an imaging position.

Here, the optical path adjustment module 200 may be configured to converge the first polarized light (the first polarized light beam) and the second polarized light (the second polarized light beam) to the same imaging position, respectively. Through the converge, the cross sections of the first polarized light beam and the second polarized light beam at the imaging position become relatively small and can even approach a point.

The controllable switch module 300 is configured to control the first polarized light and the second polarized light to be alternately irradiated out of the 3D imaging apparatus, wherein the alternating frequency between the first polarized light and the second polarized light is equal to the frame rate of the source 3D image light.

Here, the controllable switch module 300 may be arranged at the imaging position so as to control the first polarized light (the first polarized light beam) and the second polarized light (the second polarized light beam) to be alternately irradiated. Within a frame period corresponding to the left eye image, the first polarized light (the first polarized light beam) is irradiated, while the second polarized light (the second polarized light beam) is blocked. Within a frame period corresponding to the right eye image, the second polarized light (the second polarized light beam) is irradiated, while the first polarized light (the first polarized light beam) is blocked.

Since both the first polarized light beam and the second polarized light beam are converged to a relatively small imaging position, only a relatively small controllable switch module 300 is needed to control the irradiation and blockage of a polarized optic beam. The bigger a controllable switch module 300 is, the more difficult it is to control the controllable switch module, such as synchronization of its parts. Therefore, (in the present application), the device manufacturing cost and the control complexity are lowered.

Since the first polarized light (the first polarized light beam) and the second polarized light (the second polarized light beam) are converged to the same imaging position, moreover, only one controllable switch module 300 is needed. Therefore, there is no need to provide a controllable switch module for each of the two polarized light beams, which reduces the device manufacturing cost and avoids controls like synchronization of two controllable switch modules.

Since the first polarized light (the first polarized light beam) and the second polarized light (the second polarized light beam) divided from the light source dividing module 100 have different emergent directions, respectively, and correspond to different optical paths, the directions in which they are converged to the imaging position (incident to the controllable switch module 300) are different as well. Correspondingly, the directions in which they exit from the controllable switch module 300 are different as well. Here, the controllable switch module 300 can be configured to substantially not change the proceeding directions of the first polarized light (the first polarized light beam) and the second polarized light (the second polarized light beam).

Subsequently, the first polarized light (the first polarized light beam) and the second polarized light (the second polarized light beam) that pass through the controllable switch module 300 can be guided to the left eye and the right eye of a user, respectively.

Specifically, when the source 3D image is a left eye image, the controllable switch module 300 blocks the second polarized light (the second polarized light beam), and the first polarized light (the first polarized light beam) carries the left eye image information and enters the user's left eye; when the source 3D image is a right eye image, the controllable switch module 300 blocks the first polarized light (the first polarized light beam), and the second polarized light (the second polarized light beam) carries the right eye image information and enters the user's right eye.

In FIG. 4, arrows marked with numbers are used to illustrate light propagation in the operating process of the above 3D imaging apparatus, wherein an arrow marked with ① represents a source 3D imaging light, and arrows marked with ② represent a first polarized light and a second polarized light.

It can be seen from the above apparatus structure that embodiments of the present application use a light source dividing module to divide a source 3D light into two polarized light beams with the vibration directions perpendicular to each other, and use an optical path adjustment module and a controllable switch module to irradiate the two polarized light beams alternately, which alternately enter left and right eyes of a viewer, cause parallax between the left and right eyes of the viewer, and synthesize a source 3D image in the viewer's brain; therefore, each 3D imaging system only needs one 3D imaging apparatus according to the embodiments of the present application to complete 3D imaging, with no need of corresponding 3D glasses. As a result, the system structure can be simplified and the system cost can be reduced.

In a practical embodiment of the present application, the optical path adjustment module 200 may specifically use a lens with relatively high transmittance to achieve, i.e. through refraction of light by the lens, adjustments of optical paths of the above first polarized light and second polarized light.

In another practical embodiment of the present application, the controllable switch module 300 may use a liquid crystal mask switch.

The light source dividing module 100 may specifically use any one of the following: a uniaxial crystal, a colorless optical glass, a first optical device formed by a transparent liquid and an applied electric field thereof, and a second optical device formed by a transparent liquid and an applied magnetic field thereof, wherein the uniaxial crystal is capable of producing a natural birefringence effect, the colorless optical glass is capable of producing a stress birefringence effect, the first optical device is capable of producing an electro-optic birefringence effect, and the second optical device is capable of producing a magneto-birefringence effect, thereby achieving the division of a source 3D image light into the above first polarized light and second polarized light.

Figure 5:
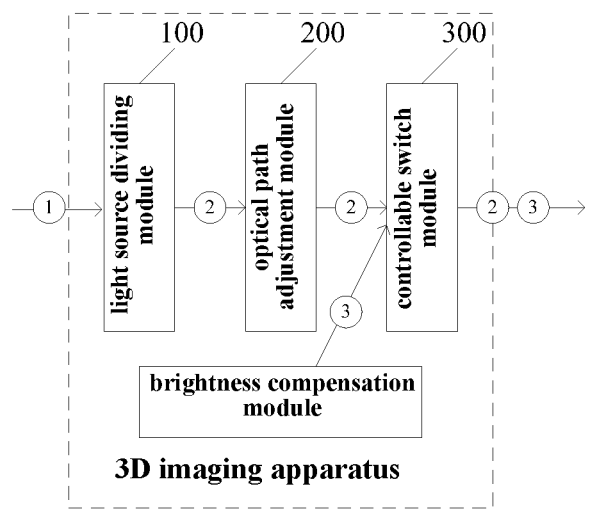
FIG. 5 is a structural schematic diagram of another 3D imaging apparatus according to an embodiment of the present application.

In yet another practical embodiment of the present application, the above 3D imaging apparatus further comprises: a brightness compensation module 400 as shown in FIG. 5; the brightness compensation module 400 is configured to irradiate an auxiliary parallel light to the controllable switch module, such that the auxiliary parallel light is irradiated together with the first polarized light and the second polarized light. Here, FIG. 5 also uses arrows marked with numbers to illustrate light propagation in the operating process of the above 3D imaging apparatus, wherein an arrow marked with ① represents a source 3D imaging light, arrows marked with ② represent a first polarized light and a second polarized light, and an arrow marked with ③ represents an auxiliary parallel light.

The above auxiliary parallel light is used to provide brightness compensation for the first polarized light and the second polarized light, thereby increasing the imaging brightness and preventing visual fatigue of a viewer. Optionally, the above brightness compensation module 400 may comprise an auxiliary light source and a convex lens. According to the optical features of the convex lens, the auxiliary light source is placed at the focus at one side of the convex lens, and a parallel light can be obtained at the other side thereof.

After considering the description and practicing the invention disclosed herein, a person skilled in the art could easily conceive of other implementation solutions of the present invention. The present application is intended to cover any variation, use or adaptive change of the present invention. These variations, uses or adaptive changes follow general principles of the present invention and comprise common general knowledge or common technical means in the art that are not disclosed by the present application. The description and embodiments are only deemed as illustrative, and the true scope of spirit of the present invention shall be subject to the following claims.

It should be understood that the present invention is not limited by the accurate structure described above and illustrated in the accompanying drawings, and can be subject to various modifications and variations without departing from the scope thereof. The scope of the present invention is only limited by the appended claims.

What is claimed is:

1. A 3D imaging apparatus, comprising:
    a light source dividing module configured to: divide, through a birefringence effect, a source 3D image light into a first polarized light carrying left eye image information and a second polarized light carrying right eye image information;
    an optical path adjustment module configured to adjust optical paths of the first polarized light and the second polarized light according to an imaging position; and
    a controllable switch module configured to control the first polarized light and the second polarized light to be alternately irradiated at an alternating frequency equal to a frame rate of the source 3D image light.

2. The 3D imaging apparatus according to claim 1, wherein
    the light source dividing module is configured to make the first polarized light and the second polarized light to have different emergent directions.

3. The 3D imaging apparatus according to claim 1, wherein the optical path adjustment module is configured to converge the first polarized light and the second polarized light to the imaging position, respectively.

4. The 3D imaging apparatus according to claim 1, wherein
the controllable switch module is arranged at the imaging position.

5. The 3D imaging apparatus according to claim 1, wherein
the first polarized light and the second polarized light exit the controllable switch module in different directions.

6. The 3D imaging apparatus according to claim 1, wherein
the first polarized light and the second polarized light are guided, after being irradiated from the controllable switch module, to a left eye and a right eye of a user, respectively.

7. The 3D imaging apparatus according to claim 1, further comprising
a brightness compensation module configured to irradiate an auxiliary parallel light to the controllable switch module, such that the auxiliary parallel light is irradiated together with the first polarized light and the second polarized light.

8. The 3D imaging apparatus according to claim 1, wherein the light source dividing module comprises any one of the following:
a uniaxial crystal capable of producing a natural birefringence effect, a colorless optical glass capable of producing a stress birefringence effect,
a first optical device formed by a transparent liquid capable of producing an electro-optic birefringence effect and an applied electric field thereof, and
a second optical device formed by a transparent liquid capable of producing a magneto-birefringence effect and an applied magnetic field thereof.

9. The 3D imaging apparatus according to claim 1, wherein the light source dividing module comprises an anisotropic medium, and the source 3D image light enters the medium along a direction other than an optical axis of the medium.

10. The 3D imaging apparatus according to claim 1, further comprising:
an image projector configured to project the source 3D image light at the frame rate to the light source dividing module, wherein the source 3D image light comprises a left eye image light and a right eye image light that alternate frame by frame.

11. A 3D imaging method, comprising:
dividing, through a birefringence effect, a source 3D image light into a first polarized light carrying left eye image information and a second polarized light carrying right eye image information;
adjusting optical paths of the first polarized light and the second polarized light according to an imaging position; and
controlling the first polarized light and the second polarized light to be alternately irradiated at an alternating frequency equal to a frame rate of the source 3D image light.

12. The 3D imaging method according to claim 11, wherein
the first polarized light and the second polarized light divided through a birefringence effect have different emergent directions.

13. The 3D imaging method according to claim 11, wherein
the step of adjusting optical paths of the first polarized light and the second polarized light according to an imaging position comprises:
converging the first polarized light and the second polarized light to the imaging position, respectively.

14. The 3D imaging method according to claim 11, wherein
the step of controlling the first polarized light and the second polarized light to be alternately irradiated comprises:
controlling the first polarized light and the second polarized light to be alternately irradiated with a controllable switch module arranged at the imaging position.

15. The 3D imaging method according to claim 14, wherein
the first polarized light and the second polarized light exit the controllable switch module in different directions.

16. The 3D imaging method according to claim 14, wherein
the first polarized light and the second polarized light that pass through the controllable switch module are guided to a left eye and a right eye of a user, respectively.

17. The 3D imaging method according to claim 11, further comprising:
controlling an auxiliary parallel light to be irradiated together with the first polarized light and the second polarized light.

18. The 3D imaging method according to claim 11, wherein
the birefringence effect is one of a natural birefringence effect based on a uniaxial crystal, a stress birefringence effect based on a colorless optical glass, an electro-optic birefringence effect based on a transparent liquid and an applied electric field thereof, and a magneto-birefringence effect based on a transparent liquid capable of producing and an applied magnetic field thereof.

19. The 3D imaging method according to claim 11, wherein
the source 3D image light is divided by passing through an anisotropic medium along a direction other than an optical axis of the medium.

20. The 3D imaging method according to claim 11, further comprising:
projecting the source 3D image light at the frame rate, wherein the source 3D image light comprises a left eye image light and a right eye image light that alternate frame by frame.

* * * * *